US008244785B2

(12) United States Patent
Nilsson et al.

(10) Patent No.: US 8,244,785 B2
(45) Date of Patent: Aug. 14, 2012

(54) METHOD OF GENERATING RANDOM NUMBERS FOR A GAMING SYSTEM

(75) Inventors: Jens Gustav Nilsson, Saltsjo-Boo (SE); Sven Hakan Andersson, Sundbyberg (SE); Joakim Bissmark, Bromma (SE)

(73) Assignee: Acei AB (SE)

( * ) Notice: Subject to any disclaimer, the term of this patent is extended or adjusted under 35 U.S.C. 154(b) by 1051 days.

(21) Appl. No.: 12/111,781

(22) Filed: Apr. 29, 2008

(65) Prior Publication Data

US 2008/0270503 A1    Oct. 30, 2008

(30) Foreign Application Priority Data

Apr. 30, 2007    (AU) ................. 2007902251

(51) Int. Cl.
*G06F 7/58*    (2006.01)
(52) U.S. Cl. ....................................... 708/250
(58) Field of Classification Search .............. None
See application file for complete search history.

(56) References Cited

U.S. PATENT DOCUMENTS

| 7,496,616 | B2 * | 2/2009 | Chari et al. | 708/250 |
|---|---|---|---|---|
| 7,822,797 | B2 * | 10/2010 | Buer et al. | 708/252 |
| 7,852,162 | B2 * | 12/2010 | Gressel et al. | 331/78 |
| 7,925,684 | B2 * | 4/2011 | Luzzi et al. | 708/250 |
| 7,945,608 | B2 * | 5/2011 | Janke et al. | 708/251 |
| 2004/0064491 | A1 * | 4/2004 | Rarick | 708/250 |
| 2008/0076525 | A1 * | 3/2008 | Kim | 463/22 |

* cited by examiner

*Primary Examiner* — David H Malzahn
(74) *Attorney, Agent, or Firm* — McAndrews, Held & Malloy, Ltd.

(57) ABSTRACT

Certain embodiments of the present invention relate to methods and apparatuses for providing random numbers for a gaming system. A random number generator (RNG) processor is arranged to select a plurality of RNG system components and configure them in an RNG pipeline, to provide random numbers to a gaming system. In one embodiment, a true random number generator (TRNG) is used to generate seeds for a pseudo random number generator in the pipeline. Analysers, loggers and other elements may also be included in the pipeline.

10 Claims, 7 Drawing Sheets

METHOD OF GENERATING RANDOM NUMBERS FOR A GAMING SYSTEM

RELATED APPLICATIONS

The present application claims the benefit of priority to Australian Provisional Patent Application No. 2007902251, filed on Apr. 30, 2007, entitled "A Method of Generating Random Numbers for a Gaming System", which is herein incorporated by reference in its entirety.

FIELD OF THE INVENTION

The present invention relates to a method and apparatus for providing random numbers, and, particularly, but not exclusively, to a method and apparatus for providing random numbers for a gaming system.

BACKGROUND OF THE INVENTION

Gaming is implemented by many types of gaming systems providing many different types of games. These include traditional type casino games, such as roulette, Keno, Bingo and many others, all of which may nowadays be implemented in electronic form.

It is known to provide a gaming system which includes a game controller arranged to randomly display several symbols from a predetermined set of symbols and to determine a game outcome such as a game win based on the displayed symbols. Such gaming systems may commonly be implemented as a stepper machine provided with reels with each reel carrying several symbols of the set, or a video machine wherein selected symbols are displayed on virtual reels on a graphical display device.

Many gaming systems rely on the generation of random numbers to control the gaming systems and, in many cases, to determine the game outcome. Random numbers are commonly generated by Random Number Generators (RNGs) which may be hardware or software based. RNGs may become predictable after the generation of a large number of random numbers, or even immediately if a starting number, i.e. the seed, is predictable. Further, different game applications and different technical and/or legal circumstances may require different properties of an RNG for a particular gaming system.

Server based gaming systems are known which are arranged to control many client based games. In such server based gaming systems there is generally a need for large amounts of random numbers. Random numbers may typically be generated centrally for a game application server that serves a large number of client gaming machines.

SUMMARY OF THE INVENTION

In accordance with a first aspect, the present invention provides a random number generator (RNG) system for generating random numbers for use by a gaming system, including an RNG processor arranged to select one or more RNG system components from a plurality of RNG system components, to provide an RNG arrangement for providing random numbers.

In an embodiment, the ability to select one or more RNG system components provides for flexibility, enabling provision of an RNG arrangement that may suit particular random number generation requirements. The RNG processor may reselect system components if an RNG with different configuration is required.

In an embodiment, the RNG processor includes a selection instructor arranged to provide selection instructions for selection of the at least one RNG system component. In an embodiment, the instructions may be software instructions, which may be provided by a software file.

In an embodiment, the RNG system components are configurable. In an embodiment, the order of the components in a pipeline forming the RNG arrangement may be configured. Further, in an embodiment, the operational characteristics of each component may be configured. In an embodiment, the RNG processor includes a system component configurator arranged to configure the RNG system components in accordance with configuration parameters.

In an embodiment, the RNG processor may select a plurality of RNG system components and, may operationally associate the RNG components in a pipeline.

An RNG system component is an element which affects random number generator processing in some way. An RNG system component may comprise a random number generator, such as a standard True Random Number Generator (TRNG) and/or a standard Pseudo Random Number Generator (PRNG). The RNG system components may also comprise correctors, analysers, loggers and other elements. In an embodiment, a plurality of these elements may be operationally associated to process and output random numbers.

In an embodiment, the components selected by the RNG processor may comprise both a TRNG and a PRNG configured so that the PRNG generates random numbers based on TRNG produced random seeds. Such an RNG arrangement may be used to generate large numbers of random numbers. Other components may be included to improve reliability. For example, the RNG arrangement may be arranged to be self-checking by inserting analysing components. One or more corrector and logger components may also be included. Other components may be added.

In accordance with a second aspect, the present invention provides a random number generator (RNG) system for generating random numbers for use by a gaming system, including a plurality of RNG system components, the RNG system components being configured to provide a RNG arrangement for providing random numbers.

In an embodiment, the RNG arrangement includes a standard True Random Number Generator (TRNG) component and a standard Pseudo Random Number Generator (PRNG) component. These are operationally associated so that the PRNG is configured to generate random numbers based on TRNG produced random numbers as seeds. Other components of the RNG arrangement may include an analyser, a corrector, a logger, etc.

In accordance with a third aspect, the present invention provides a gaming system, including a random number generator system in accordance with the first or second aspect of the invention.

In accordance with a fourth aspect the present invention provides a computer program including instructions for controlling a computer to implement a random number generator system in accordance with the first aspect of the invention.

In accordance with a fifth aspect, the present invention provides a computer readable medium providing a computer programme in accordance with the fourth aspect of the invention.

In accordance with a sixth aspect, the present invention provides a data signal including a computer program in accordance with the fourth aspect of the invention.

In accordance with a seventh aspect, the present invention provides a computer program including instructions for controlling a computer to implement a random number generator system in accordance with the second aspect of the invention.

In accordance with an eighth aspect, the present invention provides a computer readable medium providing a computer program in accordance with the sixth aspect of the invention.

In accordance with a ninth aspect, the present invention provides a data signal including a computer program in accordance with the seventh aspect of the invention.

In accordance with a tenth aspect, the present invention provides a method of generating random numbers for use by a gaming system, including the steps of selecting one or more RNG system components from a plurality of available RNG system components, and configuring the selected components to provide an RNG arrangement for providing random numbers.

In accordance with an eleventh aspect, the present invention provides a method of generating random numbers, including the steps of arranging a plurality of RNG system components in operational configuration together to provide an RNG arrangement for providing random numbers.

It is known to provide a gaming system architecture where random numbers are generated by a random number generator (RNG) server for one or more RNG clients, which may be associated with one or more game applications. If the RNG server fails, then the RNG client will not receive random numbers and the game application may not be able to proceed.

In accordance with a twelfth aspect the present invention provides a gaming system, including a random number generator (RNG) client arranged to receive random numbers from an RNG server, the RNG client including an internal RNG for selectively providing random numbers.

The internal RNG may provide random numbers instead of in addition to the random numbers received from the RNG server. If the RNG server fails, for example, the RNG client may provide "backup" via its internal RNG.

In an embodiment, internal RNG may include an RNG in accordance with the first or second aspects of the present invention.

In accordance with a thirteenth aspect, the present invention provides a method of providing random numbers, including the steps of generating a set of backup random numbers for a gaming application, in place of primary random numbers generated for the gaming application.

The primary random numbers may be generated by a random number server and the backup random numbers may be generated when the primary random numbers fail or are in error.

In accordance with a fourteenth aspect, the present invention provides a computer program, including instructions for controlling a computer to implement a gaming system in accordance with the twelfth aspect of the invention.

In accordance with a fifteenth aspect, the present invention provides a computer readable medium providing a computer program in accordance with the fourteenth aspect of the invention.

In accordance with a sixteenth aspect, the present invention provides a data signal including a computer program in accordance with the fourteenth aspect of the invention.

BRIEF DESCRIPTION OF THE DRAWINGS

Features and advantages of the present invention will become apparent from the following description of certain embodiments thereof, by way of example only, with reference to the accompanying drawings, in which.

DETAILED DESCRIPTION OF CERTAIN EMBODIMENTS

FIGS. 1 through 5 and the following description describe implementations of gaming systems which require random numbers in order to control the gaming system and/or affect game outcomes. In accordance with an embodiment of the present invention, these gaming systems are provided with random numbers by a random number generating system, an embodiment of which will be described with reference to FIGS. 6 and 7.

Figure 1:
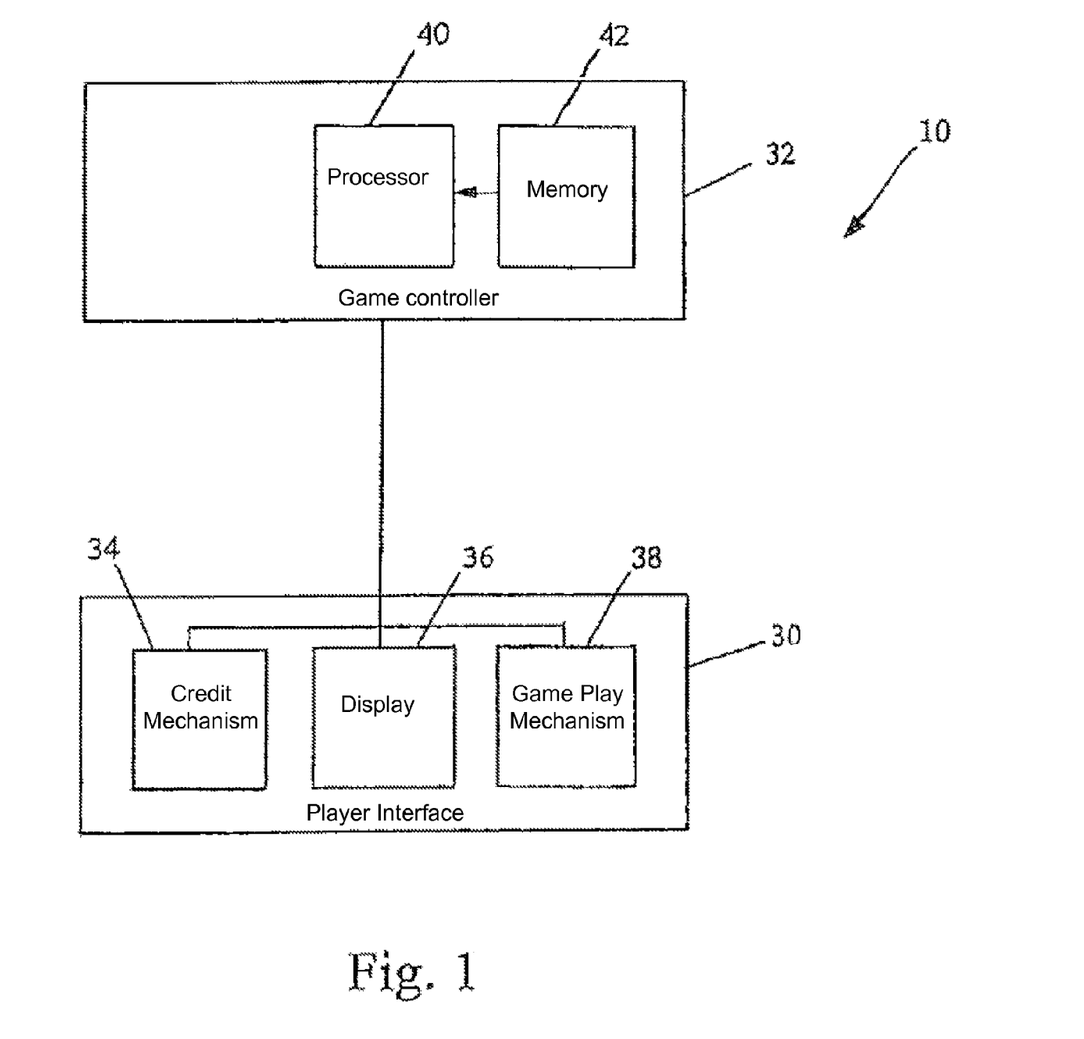
FIG. 1 is a schematic block diagram of core components of a gaming system in accordance with an embodiment of the present invention.

Referring to the drawings, there is shown a schematic block diagram of a gaming system 10 arranged to implement a probabilistic game of the type wherein several symbols from a set of symbols are randomly displayed, and a game outcome is determined on the basis of the displayed symbols. In this system, the game outcome is controlled or determined by random numbers generated by a random number generator system. In one implementation, the random number generator system includes a plurality of selectable RNG system components, from which one or more components may be selected to provide an RNG arrangement for providing the random numbers. In this embodiment, characteristics of the RNG arrangement may be determined depending upon selection of the RNG system components. Further, in this embodiment the RNG system components may be configured to adjust the characteristics of the RNG arrangement, in accordance with configuration parameters. Random number generation can therefore be adjusted to different requirements of the gaming system.

In one example, a plurality of RNG system components may be selected and arranged in a pipeline, operatively connected, to process and produce random numbers. The RNG system components may be selected so that the RNG arrangement is reliable for generating large numbers of random numbers, that may be required by the gaming system.

Referring to FIG. 1, a schematic diagram of core components of a gaming system is shown. The core components comprise a player interface 30 and a game controller 32. The player interface 30 is arranged to enable interaction between a player and the gaming system and for this purpose includes input/output components required for the player to enter instructions and play the game.

Components of the player interface 30 may vary but will typically include a credit mechanism 34 to enable a player to input credits and receive payouts, one or more displays 35 which may comprise a touch screen, and a game play mechanism 38 arranged to enable a player to input game playing instructions (e.g. to place bets).

The game controller 32 is in data communication with the player interface 30 and typically includes a processor 40 arranged to process game play instructions and output game player outcomes to the display 36. Typically, the game play instructions are stored as program code in a memory 42 that can also be hardwired. It will be understood that in this specification the term "processor" is used to refer generically to any device that can process game play instructions and may include a microprocessor, microcontroller, programmable logic device or other computational device such as a personal computer or a server.

The gaming system 10 can take a number of different forms.

In a first form, a stand alone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Figure 2:
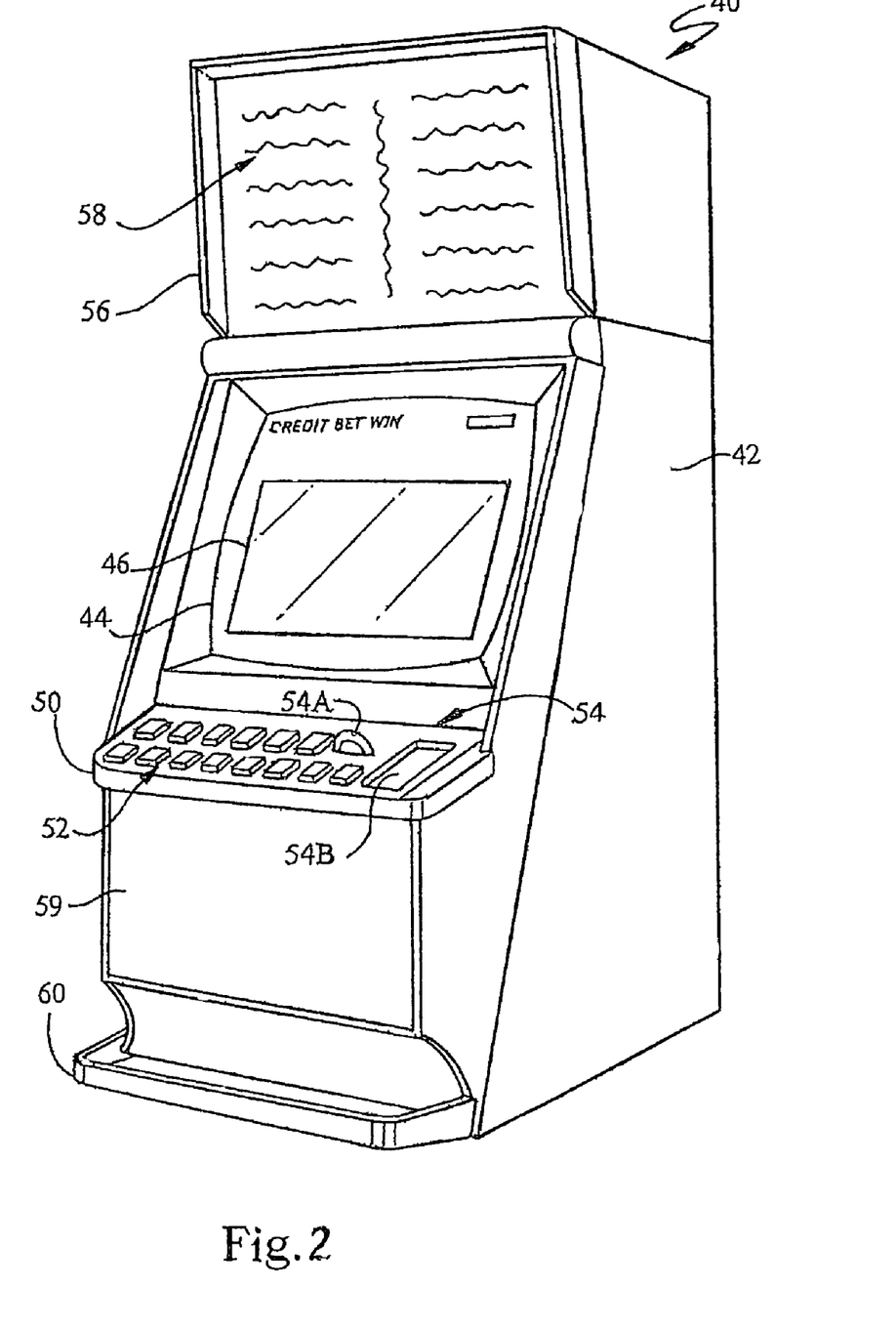
FIG. 2 is a diagrammatic representation of a gaming system in accordance with an embodiment of the present invention with the gaming system implemented in the form of a stand-alone gaming machine.

A gaming system in the form of a stand alone gaming machine 40 is illustrated in FIG. 2. The gaming machine 40 includes a console 42 having a display 44 on which is displayed representations of a game 46 that can be played by a player. A mid-trim 50 of the gaming machine 40 houses a bank of buttons 52 for enabling a player to interact with the gaming machine, in particular during gameplay. The mid-trim 50 also houses a credit input mechanism 54 which in this example includes a coin input chute 54A and a bill collector 54B. Other credit input mechanisms may also be employed, for example, a card reader for reading a smart card, debit card or credit card. A reading device may also be provided for the purpose of reading a player tracking device, for example as part of a loyalty program. The player tracking device may be in the form of a card, flash drive or any other portable storage medium capable of being read by the reading device.

A top box 56 may carry artwork 58, including for example pay tables and details of bonus awards and other information or images relating to the game. Further artwork and/or information may be provided on a front panel 59 of the console 42.

A coin tray 60 is mounted beneath the front panel 59 for dispensing cash payouts from the gaming machine 30.

The display 44 is in the form of a video display unit, particularly a cathode ray tube screen device. Alternatively, the display 44 may be a liquid crystal display, plasma screen, or any other suitable video display unit. The top box 56 may also include a display, for example a video display unit, which may be of the same type as the display 44, or of a different type.

The display 44 in this example is arranged to display representations of several reels, each reel of which has several associated symbols. Typically 3, 4 or 5 reels are provided. During operation of the game, the reels first appear to rotate then stop with typically three symbols visible on each reel. Game outcomes are determined on the basis of the visible symbols.

It will be understood that instead of providing a video display unit which displays representations of reels, physical reels may be used. Such gaming machines including actual rotatable reels are commonly termed stepper machines.

A stepper machine typically has a separate motor for each reel, and the game controller of such a gaming machine has a stop determining function that determines the stop position for each reel. For example, if there are five reels, each having twenty symbols, the stop determining function might determine that the stop positions are positions 3, 13, 7, 9 and 17. When a reel stops, the symbols will be in one of a plurality of possible symbol positions for that reel relative to the stop position.

Figure 3:
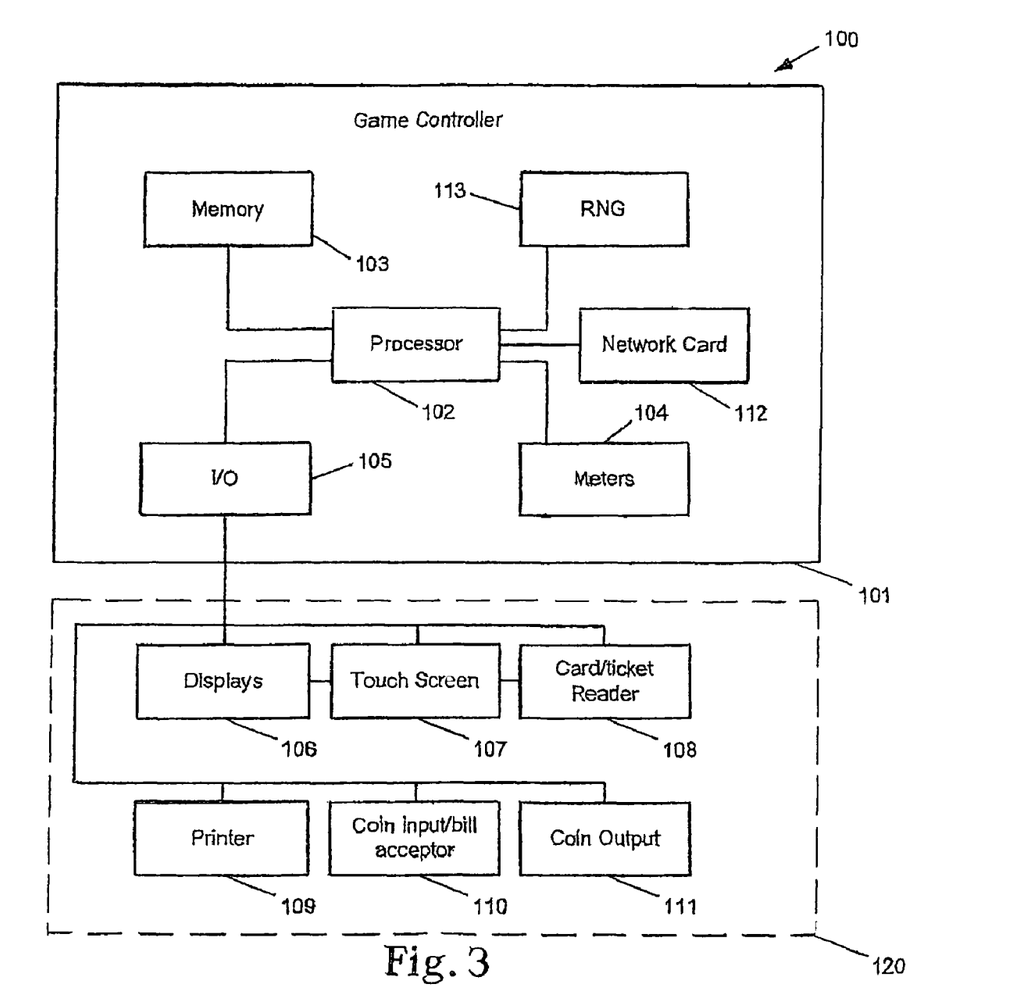
FIG. 3 is a schematic block diagram of operative components of the gaming machine shown in FIG. 2.

FIG. 3 shows a block diagram of operative components of a typical gaming machine 100 which may be the same as or different to the gaming machine shown in FIG. 2.

The gaming machine 100 includes a game controller 101 having a processor 102. Instructions and data to control operation of the processor 102 are stored in a memory 103 which is in data communication with the processor 102.

Typically, the gaming machine 100 will include both volatile and non-volatile memory and more than one of each type of memory, with such memories being collectively represented by the memory 103.

Figure 4:
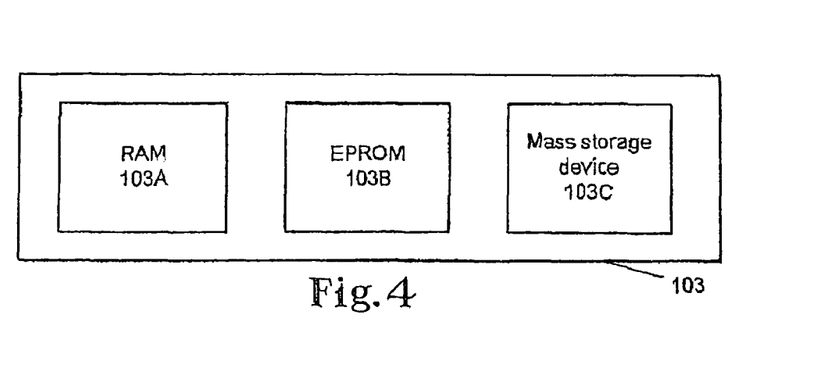
FIG. 4 is a schematic block diagram of components of a memory of the gaming machine shown in FIG. 2.

FIG. 4 shows a block diagram of the main components of an exemplary memory 103. The memory 103 includes RAM 103A, EPROM 103B and a mass storage 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

The gaming machine has hardware meters 104 for purposes including ensuring regulatory compliance and monitoring player credit, an input/output (I/O) interface 105 for communicating with a player interface 120 of the gaming machine 100, the player interface 120 having several peripheral devices. The input/output interface 105 and/or the peripheral devices may be intelligent devices with their own memory for storing associated instructions and data for use with the input/output interface or the peripheral devices. A Random Number Generator arrangement provided by a Random Number Generator system in accordance with an embodiment of the present invention is used to provide random numbers for use by the processor 102, and is represented by block 113 in FIG. 3.

In the example shown in FIG. 3, the peripheral devices that communicate with the game controller 101 comprise one or more displays 106, a touch screen and/or bank of buttons 107, a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. In addition, the gaming machine 100 may include a communications interface, for example a network card 112. The network card may, for example, send status information, accounting information or other information to a central controller, server or database and receive data or commands from the central controller, server or database.

It is also possible for the operative components of the gaming machine 100 to be distributed, for example input/output devices 106, 107, 108, 109, 110, 111 may be provided remotely from the game controller 101.

Figure 5:
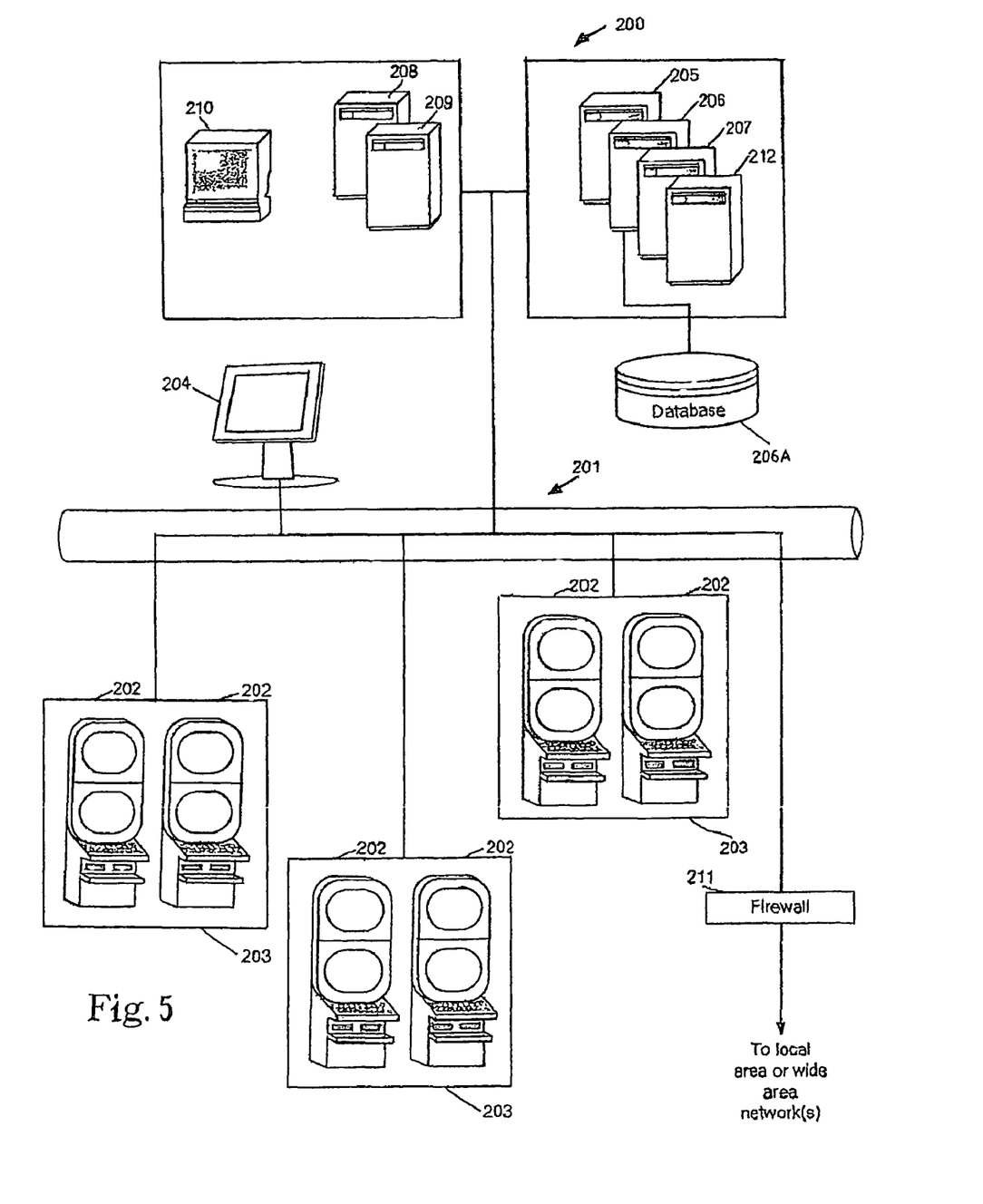
FIG. 5 is a schematic diagram of a gaming system in accordance with an alternative embodiment of the present invention with the gaming system implemented over a network.

FIG. 5 shows a gaming system 200 in accordance with an alternative embodiment. The gaming system 200 includes a network 201, which for example may be an Ethernet network, a LAN or a WAN. In this example, three banks 203 of two gaming machines 202 are connected to the network 201. The gaming machines 202 provide a player operable interface and may be the same as the gaming machines 10, 100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. The displays 204 may, for example, be associated with one or more banks 203 of gaming machines. The displays 204 may be used to display representations associated with game play on the gaming machines 202, and/or used to display other representations, for example promotional or informational material.

In a thick client embodiment, a game server 205 implements part of the game played by a player using a gaming machine 202 and the gaming machine 202 implements part of the game. With this embodiment, as both the game server 205 and the gaming machine 202 implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to monitor and carry out the Jackpot Game. A loyalty programme server 212 may also be provided.

In a thin client embodiment, the game server 205 implements most or all of the game played by a player using a gaming machine 202 and the gaming machine 202 essentially provides only the player interface. With this embodiment, the game server 205 provides the game controller. The gaming machine will receive player instructions, and pass the instructions to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming system 200, including for example a gaming floor management server 208 and a licensing server 209 to monitor the use of licenses relating to particular games. An administrator terminal 210 is provided to allow an administrator to monitor the network 201 and the devices connected to the network.

The gaming system 200 may communicate with other gaming systems, other local networks such as corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random number generator engine. Alternatively; a separate random number generator server could be provided. Further, persons skilled in the art will appreciate that a plurality of game servers could be provided to run different games or a single game so they may run a plurality of different games as required by the terminals.

Figure 6:
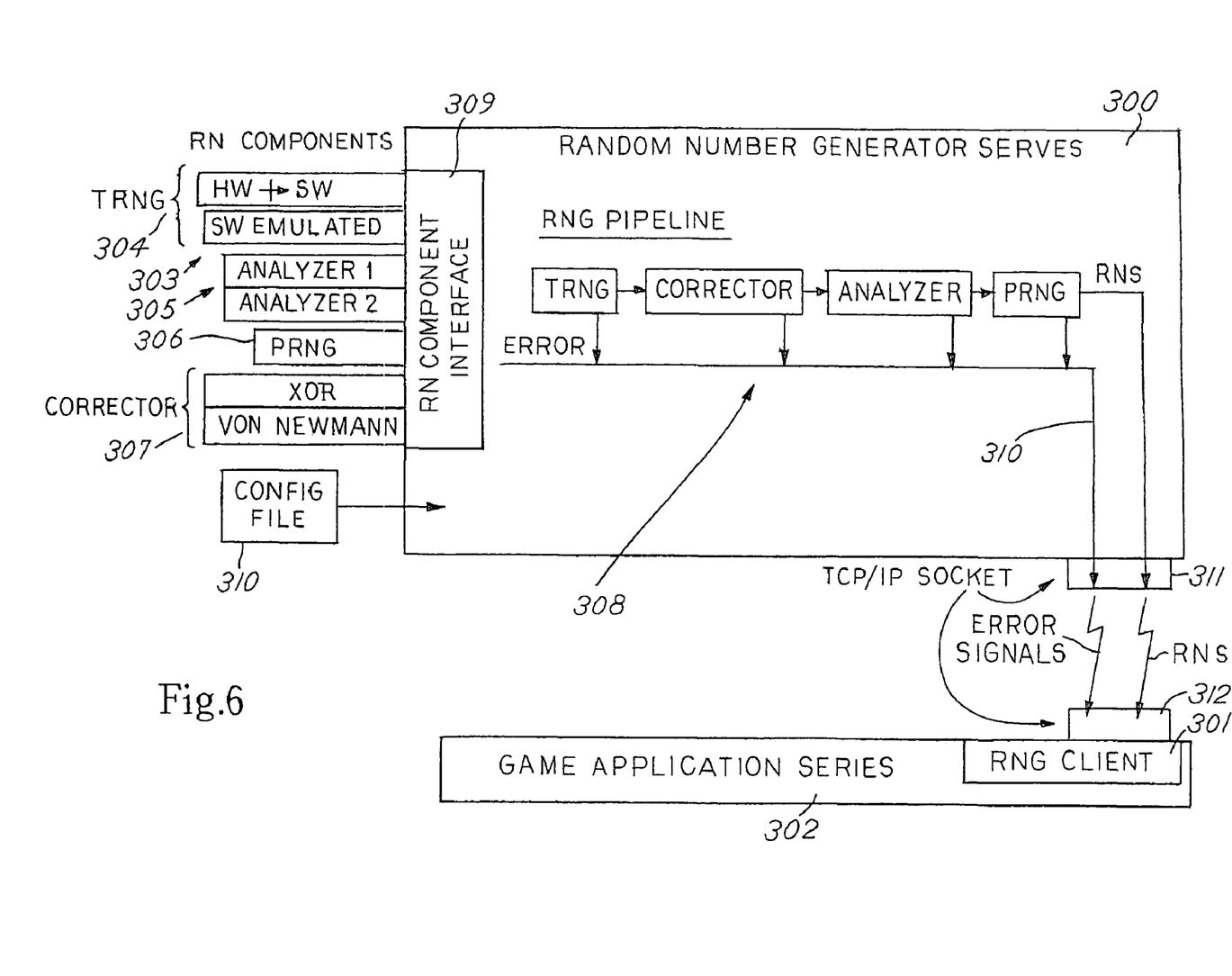
FIG. 6 is a schematic diagram of an architecture of a random number generator system for providing random numbers in a gaming system in accordance with an embodiment of the present invention.
Figure 7:
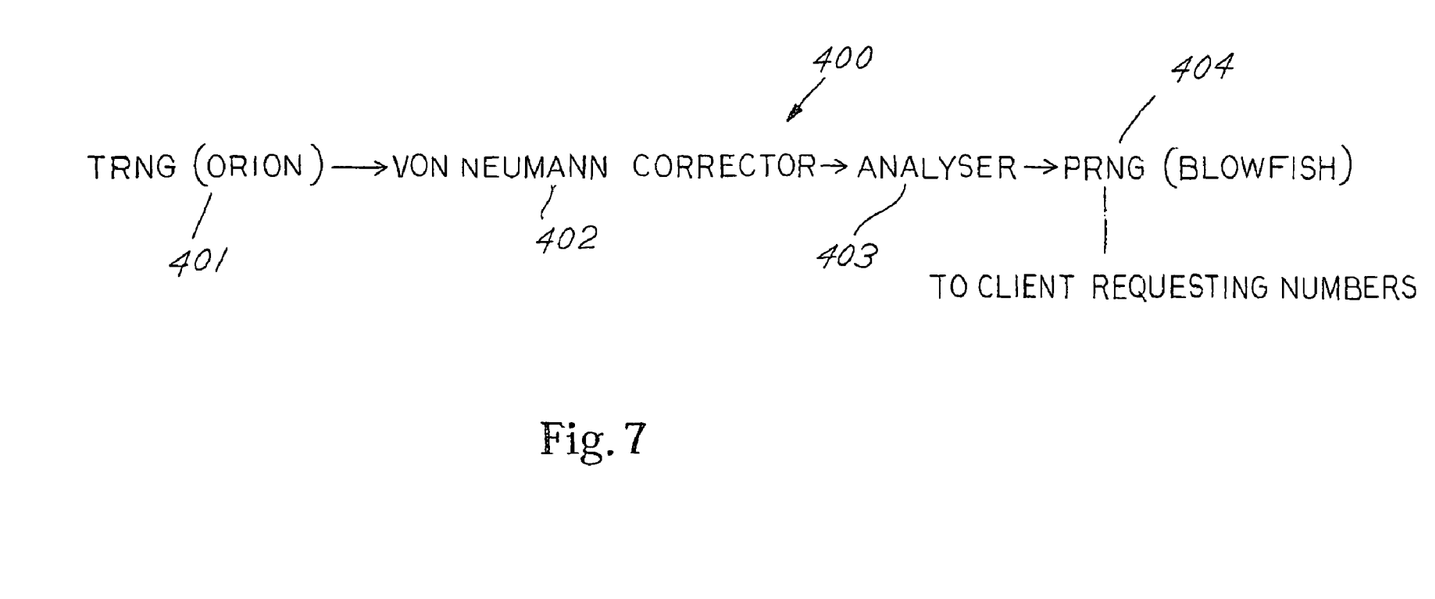
FIG. 7 is a diagram of an implementation of an RNG arrangement in accordance with an embodiment of the present invention.

Referring to FIGS. 6 and 7, an embodiment of a random number generator (RNG) system, for providing random numbers in gaming systems described previously, will now be described.

FIG. 7 is a schematic diagram of an RNG system which is implemented, in this example, in the form of an RNG server 300 serving random numbers to an RNG client 301 in a game application server 302. RNG server/client architecture is known. The game application server 302 may provide gaming instructions to multiple client gaming machines (not shown). The game application server 302/game client system may have a similar architecture to that described above with reference to FIG. 5.

Such server based gaming systems generally require large numbers of random numbers. In this embodiment, an RNG system is provided which may generate large numbers of random numbers reliably, and which is capable of being adjusted to different requirements.

The RNG system of this embodiment includes a random number generator (RNG) processor, in this example being in the form of a random number generator server 300 which has access to a plurality of selectable RNG system components 303. In this embodiment, the RNG components include components that affect processing of random numbers. In this embodiment, the components 303 include a True Random Number Generator (TRNG) 304, one or more analysers 305 (two analysers are shown in FIG. 6), a standard Pseudo Random Number Generator (PRNG) 306 and correctors 307 (two correctors are shown, being an XOR and a Von Neumann). Note that the TRNG 304 may be hardware, or software emulated.

Other components that affect processing of random numbers may be provided as selectable RNG system components in other embodiments, and the invention is not limited to only the selectable RNG system components shown in FIG. 6.

In this embodiment, the RNG processor is arranged to select at least one of the RNG system components to provide an RNG arrangement 308 for providing random numbers. The RNG processor includes a component selection instructor for providing selection instructions to instruct selection of the RNG system components, and a system component configurator for providing configuration parameters to configure the RNG system components in the RNG arrangement 308.

The component selection instructor and system component configurator are implemented, in this embodiment, as a random number component interface 309 and configuration file 310. Both elements are implemented in software. The configuration file 310 provides instructions for selection of RNG system components and configuration of those components in the RNG pipeline 308.

Example code extracted from the configuration file 310 a instruction for selecting and configuring the RNG arrangement is as follows:

```xml
<?xml version ="1.0" encoding = "iso-8859-1" ?>
- <rng port-"12344" maxconnectios="1" buffersize="4000">
- <components>
    <component type="trng" name="serial" id= "1">
        <param name = "port" value="COM1" />
        <param name = "handshake" value="false" />
        <param name = "paritycheck" value="false" />
        <param name = "baudrate" value="9600" />
        <param name = "bytesize" value="8" />
        <param name = "stopbits" value="1.0" />
        <param name = "timeout" value="5000" />
        <param name = "startupreads" value="250" />
    </component>
- <component type = "prng" name - "blowfish" id ="2">
        <param name = "reseedinterval" value="1000" />
- </component>
- <component type= "analyzer" name= "analyser" id="3">
        <param name = "maxstartupreads" value="135" />
        <param name = "ministartups" value="1" />
        <param name = "maxbyterepeats" value= "0" />
        <param name = "maxbitrepeats" value="20" />
        <param name = "statisticsinterval" value="10000" />
        <param name = "maxchisquare" value="200" />
        <param name = "chisquarefilename" value="200" />
        <param name = "chisquarefilename"
        value="chisquare_values.txt" />
    </component>
<component type="corrector" name="vonneumann" id="4" />
    <component type="trng" name ="araneus" id="5">
        <param name = "buffertimeout" value= "1000" />
    </component>
    <component type="trng" name="emulated" id="6" />
- <component type="logger" name="file" id="7">
        <param name="filename" value="trnglog.dat" />
    </component>
- <component type="logger" name="file" id="8">
        <param name="filename" value="prnglog.dat" />
    </component>
- <component type="profiler" name="console" id="9">
        <param name="interval" value="1000" />
    </component>
</components>
- <component-order>
        <component id= "5" />
        <component id= "4" />
        <component id= "3" />
        <!--    <component id= "7" />    -->
        <component id= "2" />
        <component id= "9" />
        <!--    <component id= "8" />    -->
    <component-order>
</rng>
```

The above configuration file extract selects for the RNG pipeline a TRNG (Araneus), a PRNG (in this example Blowfish) an analyser, a corrector (Von Neumann), and a logger, and provides configuration information for those selections.

The component interface is arranged to operationally connect the components in the RNG pipeline. Code below gives an example of operation of the component interface 309.

```
Class RANDOM_COMMON_API RNGComponent
{
public:
        virtual ~RNGComponent( ) { }
        RNGComponent(const String& type, const String& name) : m_type(type),
m_name(name) { }
        const String& GetType( ) { return m_type; }
        const String& GetType( ) { return m_name; }
        void AddParam(cost String& name, cost String& value);
        virtual bool Init( ) = 0;
        void SetPrevious(RNGComponent *previous) { m_previous = previous; }
        RNGComponent *GetPrevious( ) { return m_previous; }
        virtual bool Read(unit8 *buffer, uint32 size) – 0;
protected
    bool GetParam(cost String& name, String& value, bool reportError=true);
    bool GetBoolParam(cost String& name, bool &value, bool reportError=true);
    bool GetInParam(cost String& name, uint32 &value, bool reportError=true);
    bool GetDoubleParam(const String& name, double &value, bool reportError=true);
private
        typedef std::map<String, String> ParamsType;
        ParamsType m_params;
        RNGComponent *m_previous;
        String m_type;
        String m_name;
        static log::Log m_log;
};
class RANDOM_COMMON_API PRNG :public RNGComponent
{
public:
        virtual ~PRNG( ) { }
        PRNG(String type, String name) : RNGComponent(type, name) { }
        Virtual bool Read(uint8 *buffer, uint32 size) = 0
};
class RANDOM_COMMON_API PRNGBlowfish : public PRNG
{
public:
        PRNGBlowfish(String type, String name);
        virtual book Init( );
        virtual bool Read(uint8 *buffer, uint32 size);
```

```
private
    bool Seed( );
    // RNG states
    enum State {
    STATE_NOT_INITIALIZED,
    STATE_ENCIPHER_NEEDED,
    STATE_ENCIPHERED
    };
    State m_state;
    Blowfish m_blowfish;
    uint32 *m_value1;
    uint32 *m_value2;
    uint8 m_values[2*sizeof(uint32)];
    uint8 m_Pos;
    uint32 m_reseedInterval;
    uint32 m_lastReseed;
    static log::Log m_log;
};
```

The selection of components and their configuration is alterable by inputting other configuration parameters from the configuration file 310.

The component interface 309 "chains" the components together in the RNG pipeline 308. Component interface 309 provides interchangeable inputs and outputs for the selectable RNG components. In this embodiment, each RNG component takes a random number as an input and delivers a random number as an output and the components can therefore be coupled in any order.

The configuration parameters provided from the configuration file may configure the selectable RNG components with regard to:

the order of the components in series, parallel or other configurations; and the characteristics of each component.

Each RNG system component may be repeatedly used in an RNG arrangement and with different characteristics dependent on the configuration parameters.

As discussed above, multiple selectable RNG system components may be provided in the system. Examples include:

a TRNG in the shape of USB-based hardware from Araneus, and RS232 based hardware from Orion, and an emulated hardware TRNG;

a corrector in the form of an XOR-corrector and a Von Neumann-corrector (both software implementations);

an analyser in the form of a software based chi-square algorithm;

a PRNG in the shape of software based on a Blowfish cryptological algorithm;

a logger component for providing a log file of random numbers that can be positioned at any position within the RNG pipeline;

Other available components (or newly developed components) may be utilised by this embodiment of the invention.

An example implementation of an RNG arrangement in the form of RNG pipeline 400 is illustrated in FIG. 7. This RNG pipeline 400 may be implemented by the random number generator server 300, by selection and configuration of the appropriate RNG system components.

The RNG pipeline 400 components include:

An Orion TRNG 401. This is a hardware TRNG connectable in the RNG pipeline 400 via serial port;

A Von Neuman corrector 402. The corrector is used to make biased sequences non-biased;

An analyser in the form of a software based chi-square algorithm 403. The analyser tests the generated bit stream and looks for bits and does some frequency testing (inspects how often different bias occur and compares it to a chi-square distribution). Also at start up the analyser looks for repeating bias. The analyser is used to essentially monitor the operation of the TRNG and in particular to detect if it fails. The main aspect of using the analyser in this embodiment is to detect hardware failure, for instance hardware TRNGs can start to produce the same output when failing;

A PRNG 404 in the form of a Blowfish algorithm.

In addition to these components other components may be included in an implementation of the RNG arrangement. For example, a logger component may be included. The logger can be included anywhere in the pipeline. The logger writes the random numbers to a file. Loggers are used to obtain data used in certification of the RNG server 300. Any number of loggers may be used in the pipeline 308.

Referring again to FIG. 6, error signal handling may be implemented and the RNG component interface conveys error signals from the RNG components to an output of the RNG server (reference numeral 310). Random numbers and error signals are conveyed via TCP/IP socket connections 311, and 312 between the RNG server 300 and RNG client 301.

The RNG server in this embodiment is also configurable via the configuration file 310 to serve a selectable number of RNG clients 301 and to control the number of RNG clients enabled to connect.

In the embodiments of the RNG pipeline illustrated in the Figures, reference numerals 318 and 400, the RNG system components include both a TRNG and a PRNG. The PRNG is configured to generate random numbers based on TRNG produced random seeds. As discussed above, hardware RNGs have a tendency to provide biased random number output if numbers are extracted to quickly. Using a TRNG to seed a PRNG may result in the ability to produce a large amount of random numbers without significant bias.

Figure 8:
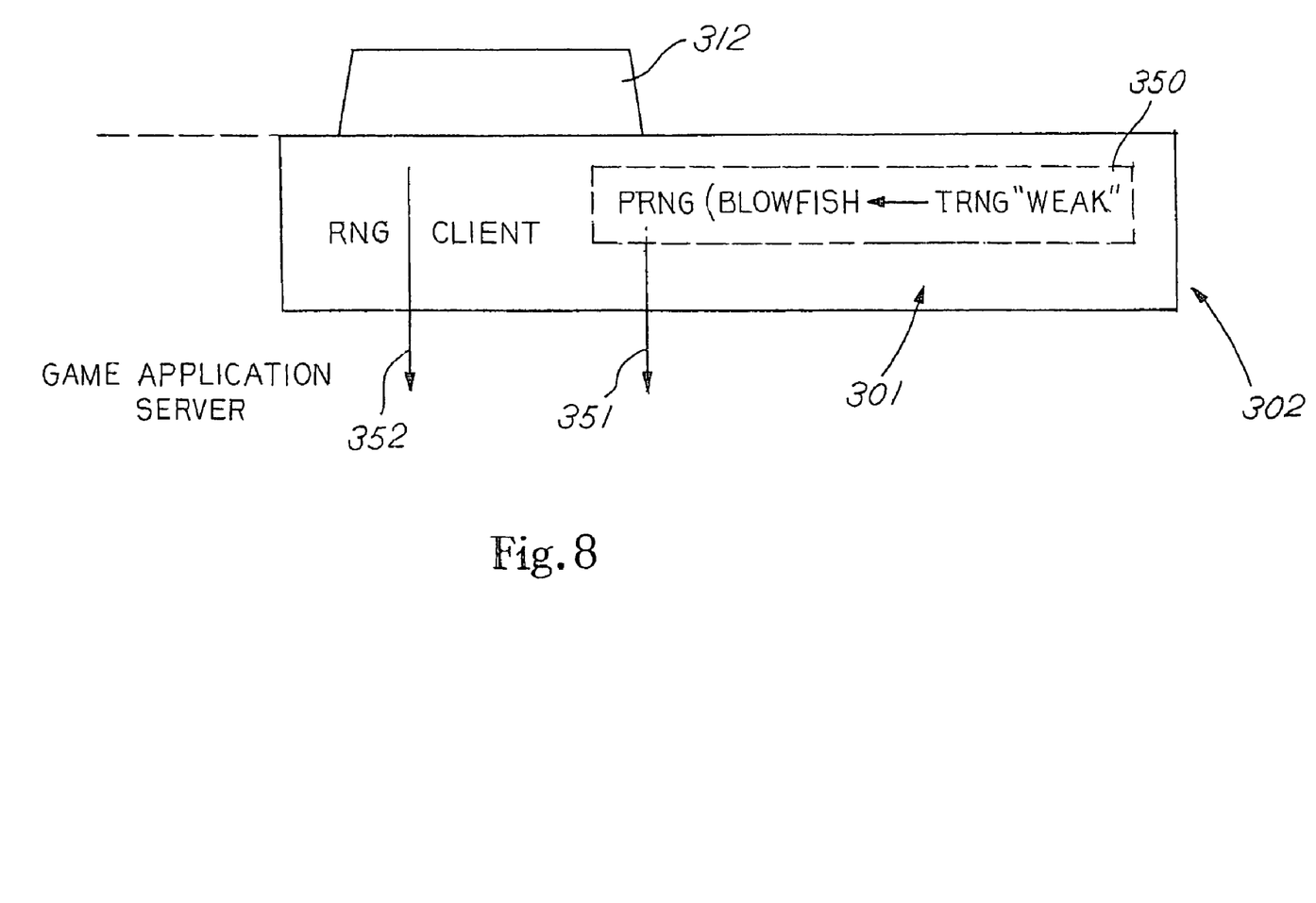
FIG. 8 is a schematic diagram of an implementation of a random number generator client in accordance with an embodiment of the present invention.

In the above-described embodiment, the random numbers are generated by the random number generator server 300, and received by the RNG client 301 and provided to the game application server 302. In an embodiment, the RNG client 301 may itself include a "backup" random number generator. Such an embodiment is illustrated in FIG. 8.

In this embodiment, the RNG client 302 normally uses the socket communication 312 to retrieve random numbers from the RNG server 300 and provide them to the game application server 302. However, the RNG client 301 also includes an internal RNG, in this embodiment being a "mini pipeline" RNG 350 for backup reasons. If the RNG server fails to provide random numbers of sufficient quality, or fails to provide random numbers at all, for example, the mini pipeline RNG 350 can "backup" and provide random numbers 351 to the game application server 302, instead of the random numbers 352 provided by the RNG server 300.

This enables the game application server 302 to continue to operate, even in circumstances where the random numbers are not being provided by RNG server 300 (or the communication has failed between RNG server and the RNG client, or the random numbers from the RNG server 300 are not of sufficient quality e.g. they may be errors in the random numbers generator).

In this example, the backup RNG generator 350 includes a mini pipeline, including an emulated TRNG 360, based on system rand ( ) function. This is considered to be a "weak" TRNG implementation. Random numbers from the TRNG are used to seed a Blowfish PRNG 361. If the embedded PRNG fails, the client will eventually fall back to the system rand ( ) function.

The "weak" random numbers provided by the backup RNG 350 are returned with an error code signalling an error in retrieving random numbers. A game application server 352 then may make a decision as to whether it wishes to continue using the random numbers or not. For example, an application making non-critical decisions might elect to ignore the error signals and just make a note or an alarm of failed random numbers and continue the processing on the basis of the backup random numbers. Another application may not wish to make any game based decisions on "weak" random numbers and therefore may continue to retry to receive random numbers from the RNG server 300 or, failing this, it may fail the game.

In this embodiment, the backup RNG 350 in the RNG client 301 includes two components. It may comprise more or less components than this, depending upon backup requirements.

Note that embodiments of the invention are not limited to the RNG client having a backup RNG, and systems may run without backup RNGs in the RNG client.

The above-described embodiments are used to generate random numbers for one or more game application servers for serving multiple games. The RNG system of this invention is not limited to providing RNGs only for client/server gaming systems. In some circumstances, an RNG system such as this may be provided for use with a stand alone game machine only, for example. Other arrangements may also be implemented.

In the above embodiment, a separate RNG server is provided. The invention is not limited to this type of architecture. For example, an RNG system in accordance with the present invention may be implemented as an RNG engine within a game application server. Or it may be implemented as an RNG engine within a stand alone game machine. Other implementations are possible.

In the above embodiment, the RNG processor of the RNG system includes a components selection instructor and a system component configurator. The RNG processor is not limited to this architecture and other architectures may be implemented.

In the above embodiment, random numbers are generated for gaming systems of the type including gaming machines which may randomly display several symbols from a predetermined set of symbols and determine a game outcome based on the displayed symbols. The RNG system of this invention is not limited to this application. The RNG system of this invention may be used for any form of gaming where random numbers are required. For example, electronically implemented roulette, other casino games, Keno, Bingo and any other games.

In the above embodiment, the component selector has implemented as a random number component interface 309 in configuration file 310, in software. A random number component interface and configuration file may alternatively be implemented in software or hardware and software.

In embodiments of the present invention, an RNG arrangement may be "built" from a plurality of selectable RNG system components. The RNG arrangement may therefore be configured with appropriate characteristics for particular applications. The RNG arrangement may be reconfigured if requirements change. For example, within a configurable RNG pipeline it is possible to change TRNG hardware (and drivers) depending upon availability of such hardware. It is also possible to choose a PRNG depending on application needs. For example, other PRNGs include the mersenne twister PRNG. Reasons for different PRNG could be due to different performance requirements, for example, as some PRNG algorithms are faster than others, or an application could have specific requirements on the distribution of the random numbers. The Blowfish PRNG is a cryptologically safe algorithm that also generates high quality random numbers.

In other embodiments, RNG arrangements containing a plurality of operationally associated RNG system components may be provided as "stand alone" random number generators which are not capable of reconfiguration. Such RNG generators, including a "chain" of operationally associated RNG components, will have applications in generating reliable large numbers of random numbers, for example. Such an embodiment would not need a supply of RNG system components to select from.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The claims defining the invention are as follows:

1. A random number generator (RNG) system including an RNG server for serving random numbers to an RNG client, the RNG server configured for generating random numbers for use by a gaming system, the RNG server comprising:
   an RNG processor arranged to select one or more RNG system components from a plurality of RNG system components, including:
      one or more true random number generators (TRNGs) arranged to produce random seeds;
      one or more pseudo random number generators (PRNGs) arranged to produce random numbers based on the random seeds produced by the one or more TRNGs; and
      at least one analyzer arranged to monitor at least one of the one or more TRNGs and to detect any repeating bias thereby to determine whether or not the at least one of the one or more of the TRNGs has failed.

2. A system in accordance with claim 1, wherein the RNG processor is responsive to selection instructions to select at least one of the plurality of RNG system component.

3. A system in accordance with claim 2, wherein the RNG processor comprises a component selection instructor arranged to provide the selection instructions.

4. A system in accordance with claim 3, wherein the component selection instructor and system component configurator comprise software for providing the selection instructions and configuration parameters.

5. A system in accordance with claim 1, wherein the RNG processor is arranged to operationally associate the RNG components in a pipeline.

6. A system in accordance with claim 1, wherein the selectable RNG system components further comprise one or more of the following:
   (a) a corrector; and
   (b) a logger.

7. A method of generating random numbers for use by a gaming system, comprising the steps of selecting one or more RNG system components from a plurality of available RNG system components, the plurality of available RNG system components including:

one or more true random number generators (TRNGs) arranged to produce random seeds:

one or more pseudo random number generators (PRNGs) arranged to produce random numbers based on the random seeds produced by the one or more TRNGs; and at least one analyzer arranged to monitor at least one of the one or more TRNGs and to detect any repeating bias thereby to determine whether or not the at least one of the one or more TRNGs has failed; and configuring the selected components to provide an RNG arrangement for providing random numbers.

8. A method in accordance with claim 7, further comprising the step of configuring the selected at least one or more RNG system component in accordance with configuration parameters.

9. A method in accordance with claim 8, wherein the configuration parameters are provided as a software file.

10. A method in accordance with claim 7, wherein the step of configuring the selected RNG system components comprises the step of operationally associating the RNG system components in a pipeline.

* * * * *